US007188168B1

(12) United States Patent
Liao

(10) Patent No.: US 7,188,168 B1
(45) Date of Patent: *Mar. 6, 2007

(54) METHOD AND APPARATUS FOR GRAMMATICAL PACKET CLASSIFIER

(75) Inventor: Heng Liao, Burnbary (CA)

(73) Assignee: PMC-Sierra, Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/557,736

(22) Filed: Apr. 25, 2000

Related U.S. Application Data

(63) Continuation-in-part of application No. 09/538,132, filed on Mar. 29, 2000.

(60) Provisional application No. 60/132,061, filed on Apr. 30, 1999, provisional application No. 60/131,989, filed on Apr. 30, 1999.

(51) Int. Cl.
*G06F 15/173* (2006.01)
*G06F 15/16* (2006.01)

(52) U.S. Cl. .................. 709/224; 709/227; 709/228; 709/231

(58) Field of Classification Search ........ 709/223–228, 709/238–240, 246–247, 230–231, 220; 704/10
See application file for complete search history.

(56) References Cited

U.S. PATENT DOCUMENTS

| 5,365,514 | A | | 11/1994 | Hershey et al. ............... 370/17 |
|---|---|---|---|---|
| 5,414,650 | A | * | 5/1995 | Hekhuis ..................... 708/203 |
| 5,568,471 | A | | 10/1996 | Hershey et al. ............... 370/17 |
| 5,704,060 | A | * | 12/1997 | Del Monte .............. 707/104.1 |
| 5,822,603 | A | | 10/1998 | Hansen et al. ......... 395/800.01 |
| 5,855,015 | A | * | 12/1998 | Shoham ........................ 707/5 |
| 5,867,799 | A | * | 2/1999 | Lang et al. .................... 707/1 |
| 5,951,674 | A | * | 9/1999 | Moreno ...................... 712/210 |
| 5,956,721 | A | | 9/1999 | Douceur et al. ............. 707/10 |
| 5,960,200 | A | * | 9/1999 | Eager et al. ................ 717/147 |
| 5,995,971 | A | | 11/1999 | Douceur et al. ........... 707/102 |
| 6,141,349 | A | * | 10/2000 | Ikeda et al. ................. 370/405 |
| 6,172,990 | B1 | * | 1/2001 | Deb et al. ................... 370/474 |
| 6,226,680 | B1 | * | 5/2001 | Boucher et al. ............ 709/230 |
| 6,266,664 | B1 | * | 7/2001 | Russell-Falla et al. ......... 707/5 |
| 6,378,126 | B2 | * | 4/2002 | Tang .......................... 717/143 |
| 6,424,934 | B2 | * | 7/2002 | Welfeld ....................... 703/25 |
| 6,457,051 | B1 | * | 9/2002 | Riddle et al. ............... 709/224 |
| 6,701,338 | B2 | * | 3/2004 | Narad et al. ................ 708/525 |

FOREIGN PATENT DOCUMENTS

WO   WO 97/08616   3/1997

* cited by examiner

*Primary Examiner*—Abdullah Salad
*Assistant Examiner*—Hussein El-chanti
(74) *Attorney, Agent, or Firm*—Townsend and Townsend and Crew

(57) ABSTRACT

A packet classification language (GPCL) is provided to specify protocol hierarchies among data packets in a routing device. The GPCL uses regular expressions to match incoming data packets and a syntax to describe the protocol hierarchy. A GPCL compiler produces an enhanced DFA which incorporates the regular expression for recognizing constituent parts of a data packets and which incorporates the grammar graph defining the relationships among the constituent parts. A hardware implemented DFA is used to scan the input stream which constitutes the data packets.

24 Claims, 8 Drawing Sheets

GRAMMAR GRAPH
FOR THE PROTOCOL SUITE

METHOD AND APPARATUS FOR GRAMMATICAL PACKET CLASSIFIER

CROSS-REFERENCES TO RELATED APPLICATIONS

This application claims priority from U.S. Application 60/132,061, filed Apr. 30, 1999, and is a continuation-in-part of U.S. application Ser. No. 09/538,132, filed Mar. 29, 2000 which claims priority from U.S. Application 60/131,989, filed Apr. 30, 1999, all of which are assigned to the assignee of the present invention, all of which are herein fully incorporated by reference for all purposes.

BACKGROUND OF THE INVENTION

The present invention is related to network data switches and more particularly to a syntax-based packet classification method and apparatus therefor.

Modern high performance switches, routers, traffic management devices and other network equipment generally process and transmit digital data that have been formatted into data packets, with each packet having one or more packet headers and packet data.

Referring to FIGS. 10A and 10B, a typical networking systems achieve communication between entities using a layered protocol architecture. A data packet is encoded according to the protocol layer. At each layer, a packet header containing protocol control information is concatenated with the data from the higher layer. This combination of data from the higher layer and control information is known as a protocol data unit (PDU). In general, the data packet is a multi-layer data structure that starts with a protocol header for the first layer 1002, followed by the higher layer headers 1004, 1006, 1008, and ends with data from the protocol data of the top layer 1008. FIG. 10B illustrates a flattened view of a typical arrangement of such hierarchically encapsulated packets.

A network protocol family usually has dependencies among the protocols. One protocol may require a specific lower layer protocol support, while the others may be built upon several different lower layers. For example, FIG. 6 shows a subset of a TCP/IP protocol suite structure. The dependencies in the protocol suite are reflected by the packet data formats accordingly.

Packet protocol classification plays a key role in the decision making process of modern high performance networking equipment. An incoming packet is analyzed and compared with a set of policy rules that identify certain packet attributes that require special processing. The result provides information about the protocol encapsulation format and matched policies of the received packet. Processing decisions are made based on the identified encapsulation format and policy information contained in the packet. In the process of making decisions about how to process the packet one must examine the packet layer by layer. Thus, in order to do the analysis of layer N, one needs to have made a similar analysis of layer N–1. Likewise, in order to do the analysis of layer N–1, one needs to have made a similar analysis of layer N–2, and so on.

Packet classification is an operation that is common to all packet routing and switching devices. For example, firewall filtering requires packets to be classified so that certain identified packets can be eliminated from the outgoing traffic. Packet classification is necessary to implement policy-based routing. Router access lists require packets to be classified for subsequent routing processing. Packet classification is used to identify different packets for collecting user statistics for performance monitoring and billing purposes.

A standard prior art method of processing packets uses protocol discrimination software to analyze packet protocol structure and to classify a packet according to a set of policies. The protocol discrimination software code usually compares, layer by layer, the key control or data fields of the packet. A decision tree is crafted to direct the processor to the discrimination code for the next layer when processing of the discrimination code at the previous layer is finished.

The software solutions require a CPU to run at a clock rate that is about an order of magnitude higher than the data receive clock rate in order to adequately process and route incoming packets in real time. The rapid growth in available network bandwidth makes a pure software approach expensive, impractical, and increasingly difficult to realize.

Hardware-based fixed protocol identifiers and programmable field detectors are capable of operating at much higher clock rates. These techniques inspect data fields in fixed or programmable offset positions in a packet. The fixed protocol identifiers usually recognize encapsulation protocols that are widely used, such as IP (internet protocol), VLAN (IEEE 802.1Q), and SNAP (subnet access protocol) encoded LLC (logical link control). The programmable field detectors allow limited flexibility to support customized classification rules. Since hardware identifiers and detectors can do several data field extractions and comparisons in parallel, these techniques are used to improve the processing speed of the discrimination software.

However, conventional hardware protocol identifiers, even systems enhanced with software control, can only handle a small number of simple classification rules. To provide quality of service (QoS) and fine grain traffic management, future networking applications require packet classifiers capable of handling large numbers of customized policies. These customized policies usually need to match several fixed or variable length data fields in several layers of packet headers with complex dependencies. Moreover, the end user who does not have access to the software code running in the equipment must have some means to modify these policies according to specific application requirements, without having to overhaul the software running the equipment.

In a co-pending application (U.S. application Ser. No. 09/538,132 filed Mar. 29, 2000 which is herein fully incorporated by reference and entitled "Method and Apparatus for Programmable Lexical Packet Classifier," a novel hardware lexical packet classifier is disclosed for providing line rate packet classification capability. The technique is based on regular expressions which are mapped to a DFA (deterministic finite automaton). The invention provides an effective solution for low layer packet classification applications.

However, the foregoing inventive lexical packet classification technique is not appropriate as packetization policies move up in the protocol stack. To illustrate why this is so, refer to FIG. 6 which shows a subset of the structural hierarchy of the TCP/IP protocol suite. At the lowest level are Ethernet packets, VLAN Ethernet packets, SNAP-encoded LLC, and so on. Lexical scanning is appropriate for identifying these low-level packets. The lexical packet classifier scans the packet data without structural knowledge; i.e., the constituent data bytes of a packet are scanned with the same DFA without knowing which layer of protocol structure the data bytes are coming from. To get to a high layer data field, the regular expression rule must contain the complete description of the protocol structure from the first (outermost, lowest) layer to the last (innermost, highest) layer. This is not a problem for policies that only deal with one or two protocol layers. However, to define a higher layer policy, the regular expressions become complicated because they need to describe all of the valid encapsulation options at the lower layers of a packet just to provide the hardware scanner with the knowledge to skip the valid lower layer headers before it gets to the top. Rules like this are mapped into DFAs with large numbers of states that are very expensive to implement in hardware. Furthermore, as the regular expressions get complicated, the policy set definitions become hard for an end user to understand, define, and maintain. Therefore, the hardware lexical analysis technique is only practical for lower layer applications.

What is needed is a technique capable of recognizing packets at line rates. There is a need for a technique which can recognize the internal structure of packets in real time as they arrive to the switching or routing device. It is desirable to provide the capability of classifying incoming packets on the basis of the multitude of packet layers comprising each incoming packet.

SUMMARY OF THE INVENTION

The present invention provides an efficient technique for high-layer packet syntax analysis and classification, based on a grammatical packet classification method and system for use in packet routing devices. An incoming packet is parsed to identify the hierarchical structure of the protocols comprising the incoming packet in accordance with the method and apparatus of the invention. Once parsed, the packet routing device can then dispose of the packet in accordance with the tokens and token groups comprising the packet.

The present invention overcomes limitations in prior art packet processing techniques. The invention reduces rule complexity and hardware costs, while at the same time providing line rate packet processing capability and greatly facilitating the implementation of changing packetizing policies. The packet identification method and system of the present invention can support a much larger number of complex classification and syntax rules than is possible using conventional techniques, and still maintain high throughput.

This invention solves the packet parsing problem using a unique technique. The components in specific embodiments include a GPCL (Grammatical Packet Classification Language), a compiler with compression function, and a hardware grammatical packet parser. User policies are coded in GPCL, and translated and compressed by the compiler into the hardware grammatical packet parser. The packet parser effectively decompresses the code image as it scans the input data stream to parse packets at line rate.

The invention in one aspect adapts lexical token scanning techniques developed for compilers to data communications. In this adaptation, the communication data stream is treated as byte strings to be interpreted and processed by a compiler to produce a stream of tokens. The tokens are then parsed to identify the hierarchy of protocols contained in a data packet. The data packet is then subsequently processed according to the hierarchy of protocols contained in the packet.

A hardware parser according to an embodiment of the present invention treats the input packet data structure as a language. It analyzes the packet data in a similar way that a typical computer language compiler compiles a program. The hardware grammatical packet parser does two levels of analysis: lexical analysis and grammatical analysis. The lexical analyzer scans input data bytes using lexical pattern definitions and breaks the input data stream into a string of lexical tokens. The parser obtains the token string from the lexical analyzer to do the syntactic analysis.

This two level parser/scanner analysis method simplifies the definition of policy rules. It separates the specification of a protocol header from the protocol suite structure. Within each token definition, instead of dealing with the entire protocol suite all at once, the user can concentrate on defining the generic pattern for a protocol header or specific matching requirement at one protocol layer as required. The grammar clearly outlines the hierarchy and dependencies among the protocols of different layers in a suite.

This invention prevents the DFA size explosion facing the previous lexical analysis methods. The flat lexical analysis method deals with the entire packet at once, therefore each token definition is complex and requires a large number of DFA states to implement in hardware. In contrast, the present invention breaks the protocol suite into a hierarchy of layers. Each token only defines the header of a protocol in one layer. Therefore the token definition is simplified. In addition to that, the policies are defined at the grammatical level, hence different high layer policies can share the same token definition at the lexical token level. In general, the grammatical analysis method provides a much more efficient solution.

The idea of a DFA driven ALU is extended to a processor that is driven by the state of the lexical analyzer and the parser. The parser driven processor can do simple wirespeed processing such as: generation of a protocol stack that contains protocol type and header offset information, message generation, field extraction, and flow identification. The parser driven processor can provide useful information to simplify or replace the operation of a down-stream decision engine.

The present invention is thereby able to accomplish not just lexical scanning but also grammatical parsing in hardware. The invention therefore provides an efficient technique for high layer packet syntax analysis and classification and is able handle incoming packets at line rate.

DESCRIPTION OF THE SPECIFIC EMBODIMENTS

This invention uses a language compiler technique to analyze network data packets. The protocol structure and user policies are defined in lexical and grammatical rules in GPCL (Grammatical Packet Classification Language), a packet definition language according to the present invention. A compiler converts a GPCL "program" into data structures representing the policy set. The programmable hardware packet parser loads the compiled data structures into its internal RAM (random access memory). Input packet data feeds into the parser which is capable of parsing through the data to perform lexical and grammatical analysis in real time, at line rate.

The grammar supported by the GPCL is an LL(1) grammar; the first "L" is for left-to-right scanning of the input, the second "L" for producing a leftmost derivation, and the "1" for using one input symbol of look-ahead at each step to make parsing action decisions. Although an LL(1) grammar is weak for general language parsing, it is nonetheless appropriate for the present invention, and offers an attractive and powerful tool for analyzing protocol structure for the following reasons:

The lower layer protocol header always is concatenated to the left side (beginning) of a higher layer PDU. Therefore, a left-to-right scanning, namely a leftmost derivation grammar, is suitable for processing the protocol headers.

By looking at the protocol header of one layer, one can always determine the protocol structure at the current layer. There is no need to go to the higher layer header to determine the lower layer protocol structure. Hence, a one token look-ahead scheme is sufficient for packet analysis purpose.

The LL(1) parser is easy to implement in hardware.

Figure 6:
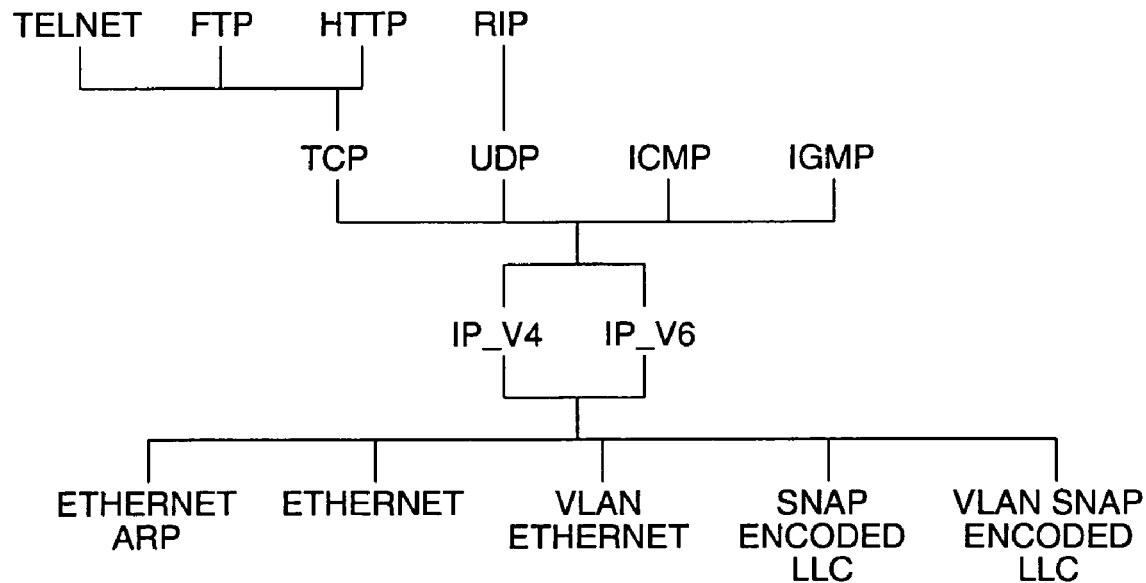
FIG. 6 is an example of the hierarchical nature of a portion of the TCP/IP protocol suite.
Figure 7:
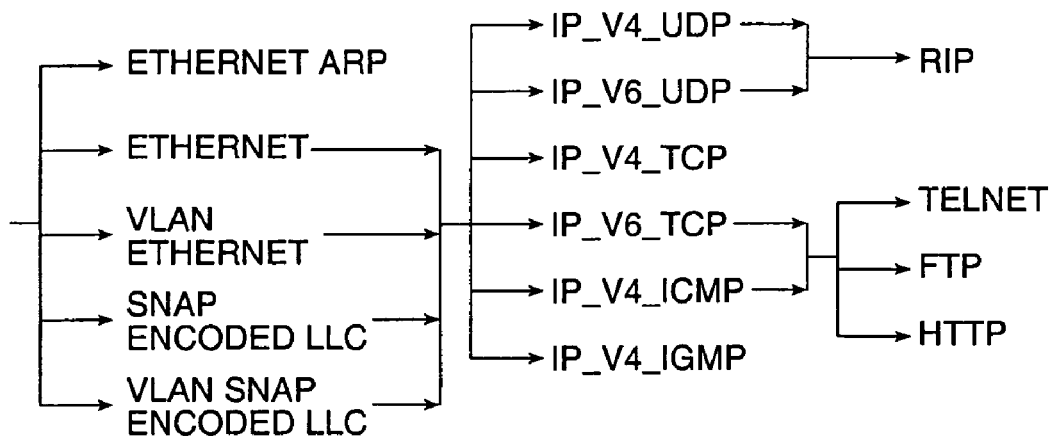
FIG. 7 illustrates a grammar graph of the protocol suite shown in FIG. 6.

FIG. 7 illustrates a grammar graph of the TCP/IP protocol suite subset shown in FIG. 6.

LL(1) grammars permit recursive definition of language elements. This feature is especially useful in applications like IPsec where IP-in-IP tunnels are used. In this case, the same protocol layer appears twice.

An LL(1) grammar can be represented by a deterministic grammar graph. The grammar graph is a directed acyclic graph. The arcs are labeled with tokens. The parser starts with the begin state of the graph. Each time the parser takes a token from the lexical analyzer, it follows the arc according to the input token to enter the next node. Each node in the grammar graph defines a token group; i.e., the set of tokens that is allowable in one grammar node.

In terms of compiler techniques for computer languages, a lexicon deals with tokens. The lexicon defines the language elements of a computer language. A token is a byte pattern that has some meaning in the particular language, such as an identifier, a reserved word, an operator, a mathematical symbol, and so on. A grammar deals with the syntax that defines the permissible combinations of the tokens. A grammar comprises the rules that define how the tokens and variable identifiers are put together meaningfully in the language.

In accordance with the invention, network data packets are viewed as a language. The dependencies in the protocol suite in a data packet are reflected by the packet data formats accordingly. Each protocol header is defined as a lexical token, while the grammar gives a precise syntactic specification of the protocol suite structure.

The GPCL (grammatical packet classification language) is a high level language that is designed for protocol lexical structure and grammatical syntax description. A GPCL consists of a list of token groups. The token groups denote the nodes in an LL(1) grammar graph. Each token group is broken down to patterns, each pattern defining a lexical token using regular expressions. A pattern label is assigned for each token. Each token also has a next-group label that defines an arc in the grammar graph. In general, the GPCL provides a precise, yet easy to read way to define the lexical pattern and grammatical rule for a protocol suite and user policies in one program.

Figure 8:
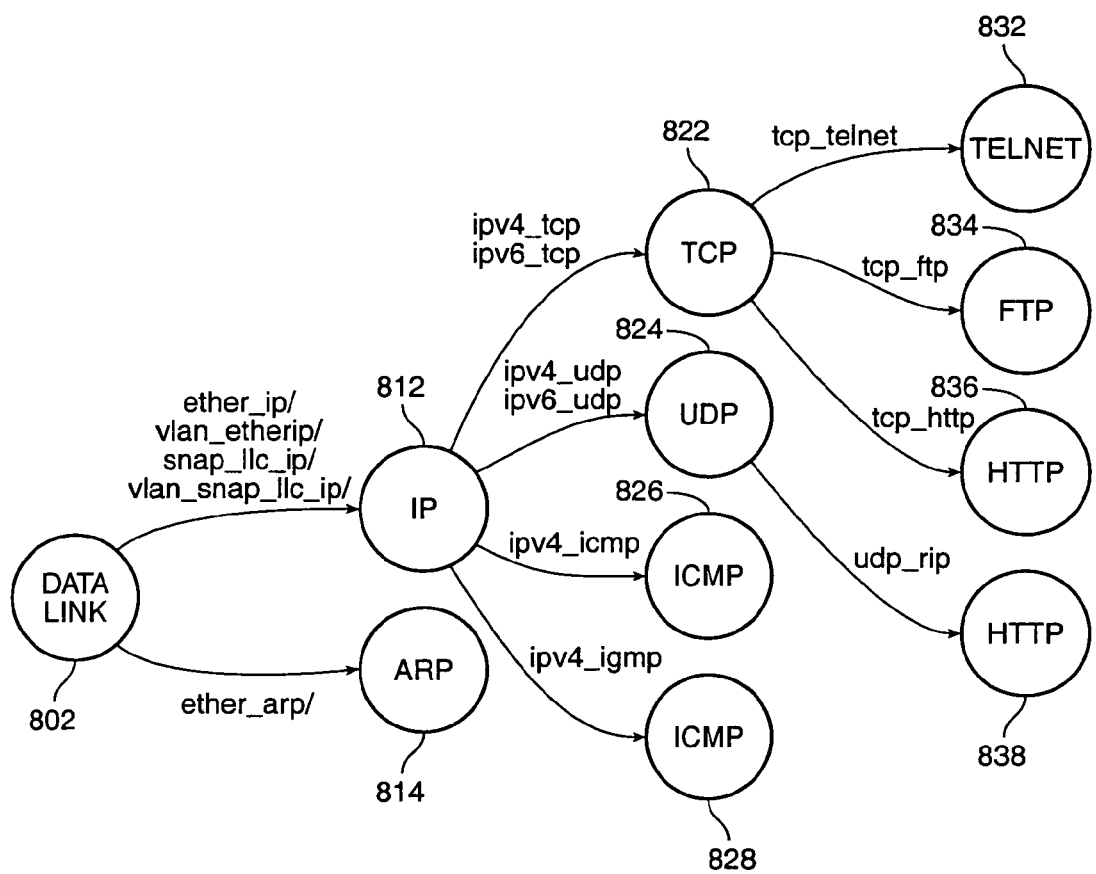
FIG. 8 shows a labeled grammar graph.

The foregoing is exemplified by the labeled grammar graph of FIG. 8. The grammar graph contains the following token groups: a data link 802, IP 812, ARP 814, TCP 822, UDP 824, ICMP 826, IGMP 828, telnet 832, ftp 834, http 836, and rip 838. The data link group comprises the following tokens: ether_ip, vlan_etherip, snap_llc_ip, vlan_snap_llc_ip, ether_arp. Likewise, the IP group includes the following tokens: ipv4_tcp, ipv6_tcp, ipv4_udp, ipv6_udp, ipv4_icmp, ipv4_igmp. Similarly, the TCP group includes tokens tcp_ftp and tcp_http. The UDP group comprises the udp_rip token.

Tokens are defined with regular expressions. Regular expressions are widely used to specify regular sets, or lexical tokens. Well-known techniques have been developed to translate regular expressions into NFAs (Non-deterministic Finite Automata) that recognize the lexical tokens defined by the expressions. Also, there are sub-set construction algorithms that reduce the NFA into a DFA (Deterministic Finite Automaton) with minimum number of states. The states of a DFA include intermediate states and terminating states. Each terminating state denotes one lexical token. The DFA token scanning process starts from the beginning state. At each step, the DFA accepts one input character, according to the current state and the input character, the DFA follows an outgoing arc to the next state in the DFA. This process is repeated until the DFA reaches a terminating state. The label of the terminating states indicates a match is found with a regular expression. Therefore, when reaching a terminating state, the token scanner ends the scanning process and produces a classification result.

For each token group, a DFA is constructed to recognize the regular expressions in the group. The DFA has one begin state, and a set of terminating states. Each terminating state identifies one token in the group. Since each grammar graph node defines a token group, it has an associated DFA that recognizes the token group. The parser consists of a set of DFAs for the token groups and a parsing engine for the grammar graph. The parsing engine is initially set to the begin node of the grammar graph that represents the lowest level protocol layer. The lexical analyzer uses the DFA that is associated with the current parsing state to scan the input packet data. When the DFA finds a token, it reports the token to the parsing engine. The parsing engine follows the grammar graph to enter the next parsing state. At the same time, the lexical analyzer switches to begin state of a new DFA that is associated with the new parsing state. In general this interlocked operation of the DFA and the parsing engine achieves the grammatical and lexical structure analysis function as it scans through the incoming data stream.

In practice, instead of building DFAs for individual token groups and the grammar graph separately, an algorithm is proposed to merge the NFAs and the grammar graph seamlessly into a large NFA with group label for the states. An enhanced sub-set construction algorithm is then applied to the combined NFA to generate a labeled DFA that integrates the lexical scanner and the parsing engine. When the labeled DFA scans the input data, the lexical state and the parsing states are updated at the same time. The DFA states represent the lexical state, and the DFA labels identify the parsing engine states.

The following sections give the details of the various aspects of the present invention. First, is a discussion of the GPCL as defined by the present invention. A DFA combining algorithm in accordance with the invention is then described. This is followed by a discussion of various embodiments of the hardware parser architecture of the invention.

A. Grammatical Packet Classification Language
The GPCL is defined by the following BNF (Backus-Naur Form):

| | |
|---|---|
| program → | comment (program) \| token_group (program) \| token_group \| comment |
| comment → | '#' text_line '\n' |
| token_group → | token_label \n    TCP (a particular group of tokens) |
| | token_group_body  A bunch of patterns; |
| token_group_body → | pattern (token_group_body) \| pattern |
| pattern → | pattern_label: next_group_label: token instr \n pattern body; (token_instr states what kind of handling can happen at that level) |
| pattern_body → | expr pattern_body \| <blank line> pattern_body \| expr |
| expr → | term expr '\n' \|        Unix-like regular |
| | term '\|' expr '\n' \|   expression |
| | term '\n' |
| term → | factor '*' \| factor '+' \| factor '?' \| factor { hexstr, hexstr } \| factor { hexstr } ; factor '^' \| factor '{' '^' hexstr '-' hexstr '}' |
| factor → | '(' expr ')' \| string \| '.' \| '[' string ']' \| '[' '~' string ']' \| '[' hexstr '-' hexstr ']' \| '[' '~' hexstr '-' hexstr ']' |

Table 1 below illustrates the syntax of regular expressions expr according to a specific embodiment of the invention, and the semantics of each. The first fifteen entries in the table include regular expression operators that are known from prior regular expression definitions. These enhanced regular expression operators and additional enhanced operators are described with greater detail in the table and in the following discussion.

TABLE 1

| Expression | Matches | Example |
|---|---|---|
| Hexstring | Byte values literally | 123a4f6789 |
| "ASC string" | ASC values literally | "Apple" |
| . (period) | Any character | |
| [String] | Any character in string | [123456] ["apple"] |
| [~string] | Any character not in string | [~123456] [~"apple"] |
| [m–n] | Any character in the range of m to n | ['a'–'z'] [01–55] |
| [~m–n] | Any character not in the range of m to n | [~"a"–"z"] [~23–66] |
| Expr * | Zero or more expr's | ["apple"]* |
| Expr + | One or more expr's | 1234* |
| Expr ? | Zero or one expr's | 1234?56 |
| Expr {m} | m occurrences of expr's | 12{14} |
| Expr {m–n} | m to n occurrences of expr's | 12{8–15} |
| Expr1 Expr2 | Expr1 then Expr2 | 1234"apple" |
| Expr1 \| Expr2 | Expr1 or Expr2 | 8808.\|12? |

TABLE 1-continued

| Expression | Matches | Example |
|---|---|---|
| (Expr) | Expr SkipX number of bytes, where X is the value of the current input byte. | (1234) |
| {^mask<shift–k} | Skip ((X &mask)<<shift – k) | |

B. GPCL Compiler and DFA Compression/Decompression Algorithm

Figure 1:
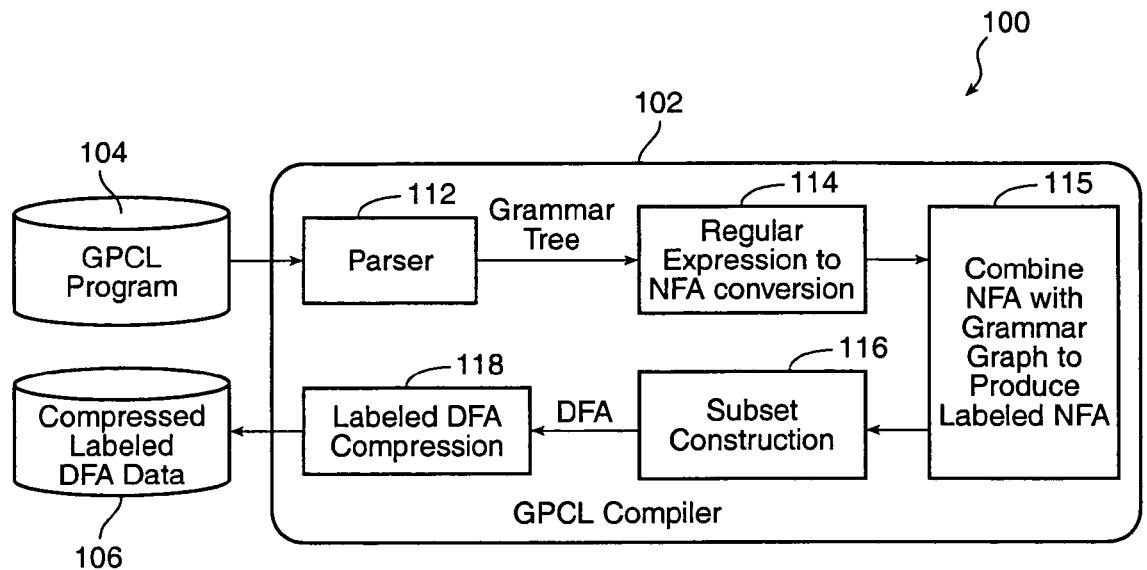
FIG. 1 is a high level overview of a GPCL compiler in accordance with the present invention.

With reference to FIG. 1, a high level illustration of a GPCL compiler 102 in accordance with an embodiment of the invention is shown. The GPCL compiler operates according to the mechanics of a typical high-level language compiler. As will be explained, the GPCL compiler does the syntactical analysis of an input GPCL program 104 and generates a compressed form of a novel labeled DFA (deterministic finite automaton) 106 that recognizes the grammar defined in the program.

The GPCL program 104 feeds into a parser 112. The parser scans the input program and recognizes the grammar syntax and GPCL tokens contained in the GPCL program to generate an internal grammar tree data structure that represents the regular expressions in the program. Then an algorithm is used to do the regular expression reduction.

Referring to the BNF, the grammar graph is defined by the GPCL program. The nodes of a grammar graph are defined by the token_group entity (labeled by token_label). The arcs of the graph are defined by the branches between the token_groups. Branches are defined in pattern statements. Each pattern specifies a pattern body corresponding to the condition of a branch. There is a next_group_label corresponding to a branch target when the condition is met and a token_instr corresponding to the operation that needs to be taken when branch condition is met.

A classic NFA (non-deterministic finite automaton) generation algorithm 114 is used to convert the grammar tree into a traditional NFA. Then, in accordance with the invention, the NFA is combined 115 in a novel manner with the grammar graph to produce a labeled NFA.

To support a byte-wide data stream, an NFA can be defined by the following elements:
(1) a set of input symbol: $\Gamma=\{0 \ldots 255\}$;
(2) a set of states: $S=\{s_1, s_2, s_3, \ldots, s_n\}$;
(3) a set of arcs:: $A=\{a_1, a_2, a_3, \ldots, a_m\}$, where each arc is defined as a 3-tuple ($S_{from}$, $S_{to}$, Label). The Label can be either a valid input symbol in $\Gamma$ or the null character $\epsilon$;
(4) a start state: $S_{start} \in S$; and
(5) a set of terminating states $T=\{s_{token1}, s_{token2}, \ldots, s_{tokenk}\} \subseteq S$.

A grammar graph comprises:
(1) a set of nodes, or token groups: $G=\{g_1, g_2, \ldots g_l\}$;
(2) a set of valid tokens: $\Phi$; and
(3) a transition function move that maps the node token pairs to sets of nodes: xmove:$(G \times \Phi \rightarrow G)$.

The labeled NFA is an NFA with a label associated with each state. The following algorithm in accordance with the invention merges a set of NFAs $\{NFA_1, \ldots, NFA_n\}$ and a grammar graph to produce a labeled NFA, L:
(1) Define the symbol set for L:
  $L.\Gamma \leftarrow \{0 \ldots 255\}$
(2) Combine the states sets of the NFAs:
  L.S=

$$L.S = \bigcup_{i=1...n} NFA_i.S$$

(3) Assign labels to the states:
   for each s∈L.S, if s∈$NFA_k$.S then s.label←k
(4) Combine the arc sets of the NFAs:
   L.A=

$$L.A = \bigcup_{i=1...n} NFA_i.A$$

(5) Add new arcs to represent the grammar graph:
   for each token group g∈G
      for each outgoing arc (g, token, $g_{to}$) from g
         find the terminating state that represents token:
            $S_{token}$
         find the begin state of NFA that represents $g_{to}$:
            $NFA(g_{to}).S_{start}$
         add a new arc with a label of null character:
            ($S_{token}$, $NFA(g_{to}).S_{start}$, ϵ)

A subset construction algorithm 116 is used to convert the labeled NFA L into an equivalent labeled DFA. The algorithm outputs a number of DFA states and a transition table. Each DFA state corresponds to a subset of NFA states. The transition table is constructed so that the DFA will simulate in parallel all possible moves the NFA can make on a given input string. Since each state of the NFA is labeled by a token group index, the generated DFA states also need to be labeled accordingly.

To calculate the DFA state label, the labels of all the NFA states corresponding to a DFA state is examined. If none of the states in the subset is a terminating NFA state, the associated DFA state is labeled with a special index indicating the state is an intermediate state that is not associated with any token group. If the subset contains one terminating NFA state, then the token identifier and the group label is copied to the DFA. If two or more of the NFA states in the subset are terminating states, an error is reported since a state collision has happened. This would be caused by ambiguity in the token definitions.

In one embodiment, special measures can be taken to define priorities among the ambiguous lexical rules to resolve the collision. In this case, the DFA state is labeled with the token and group label of the NFA terminating state with higher priority.

After the label mapping process, the DFA states are either classified as intermediate states, or token terminating states with the appropriate token and group labels. In addition to the DFA data structures, the compiler also generates an instruction list from the GPCL program. The instruction list contains one instruction for each token that is referenced by the token label of the DFA states.

In accordance with an embodiment of the present invention, a DFA of N states is represented by an N-element vector, $label_{(0 \ldots N-1)}$. Each entry in the vector label corresponds to one of the N states and includes information whether the state is a terminating state or not. If the state is a terminating state, the entry contains further information, including the matched token identifier. There are two types of terminating states: "grammar branch node" and "grammar end node." The label entry also contains flags that identify whether a node is a non-terminating state, a terminating state branch node, or a terminating state end node. When the parser reaches an end node, the end of a grammar graph is reached. Hence no further parsing is required. The parser should stop and report the class identifier associated with this node. When the parser reaches a branch node, it should report the token identifier that is associated with the state (indicating it recognizes a token in the parsing process), but the parsing should continue. The branch transition redirects the parser to the start state of the next token group.

The class index indicates the matched input (i.e., the incoming data packet) as belonging to the class identified by the index. The class index determines how the packet routing device will dispose of the incoming packet. The specific actions taken depend on the type of routing or switching device. For example, a firewall filter may simply discard certain recognized packets.

A transition matrix $L_{(0 \ldots N-1, 0 \ldots 255)}$ is represented by:

$$\begin{pmatrix} L_{(0,0)} & L_{(0,1)} & \cdots & L_{(0,255)} \\ L_{(1,0)} & \cdots & & L_{(1,255)} \\ \vdots & & \ddots & \vdots \\ L_{(N-2,0)} & \cdots & & L_{(N-2,255)} \\ L_{(N-1,0)} & \cdots & & L_{N-(1,255)} \end{pmatrix},$$

where the column is selected depending on the input character y and the row is selected depending on the current state x. Hence, the matrix element $L_{(x,y)}$ represents the next state to which a transition is made, from state x, when the input character is y. Thus, each element in row x represents the set of next states for any input character.

A typical DFA transition matrix usually has many repetitive elements in each row. The reason is that a majority of next states are the same across different input characters in each state. For example, when inputting a text string, the next state is the same as the beginning state until a termination character is input. Hence, the majority of next states in a given row may be defined as a default next state. The DFA transition matrix is therefore sprinkled throughout with default next states.

A compression algorithm 118 takes advantage of the sparse nature of the transition matrix. First, the compression algorithm calculates a default next state for each row of the matrix L and saves it in an N-element vector, $default_{(0 \ldots N-1)}$. This is done by determining, for each row, which state occurs most frequently. That state then constitutes the default state for that row. The algorithm then sets, for each row, those matrix elements in the matrix L which are equal to the default value (for that row) to zero.

After this initial processing step, the matrix L now has a lot of zeros, with the remaining non-zero elements representing the non-default transitions in the diagram. The 2-D matrix is then collapsed into a more compact one-dimensional long vector, next. In this process, another N-element vector, $base_{(0 \ldots N-1)}$ holds base positions selected for each row of L. All the non-zero elements, $L_{(x,y)}$, are copied into the $next_{(base[x]+y)}$ vector, $base_{[x]}$ being the offset into the next vector of the first non-zero element in row x of transition matrix L. Each row of the transition matrix $L_{(x,0 \ldots 255)}$ can cover a window spanning 256 elements in the next vector starting from the base address of this row: {$next_{(base[x])} \ldots next_{(base[x]+255)}$}. However, since only the non-default elements are copied into the next vector, many of the next vector elements in this window contain zero. Therefore, the base positions are chosen properly such that the windows for each row of data in the next vector overlap as much as possible to reduce the total length of the next vector, with the restriction that non-default elements from two different rows cannot be mapped into the same position in the next vector.

Another vector, owner, with size equal to the next vector is used to record the ownership of each entry in the next vector; i.e. which row in transition matrix L the entry belongs. Every time a non-default element $L_{(x,y)}$ is copied into a position in the next vector $next_{(z)}$, the corresponding element $owner_{(z)}$ is set to the value x, the row index of $L_{(x,y)}$.

Figure 2:
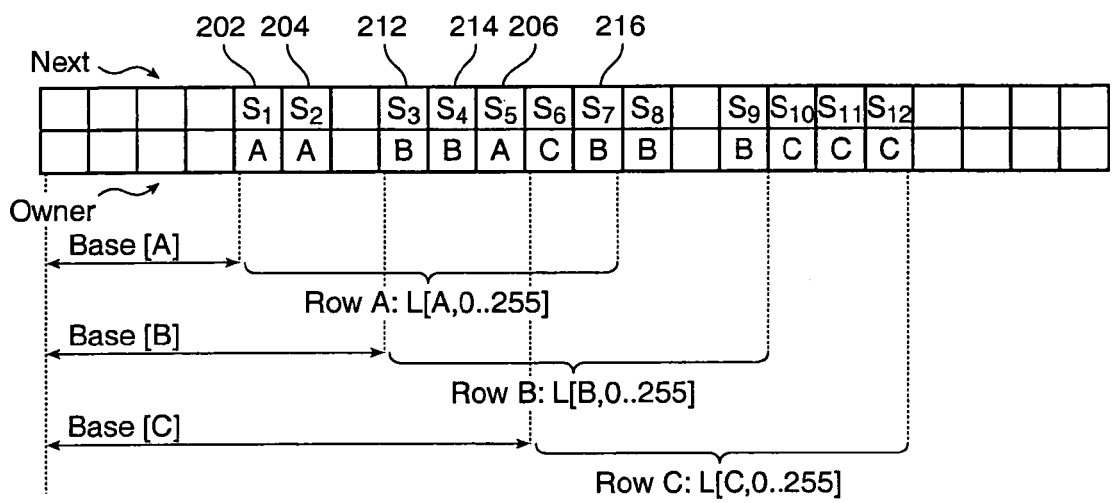
FIG. 2 is a schematic illustration of the interaction of the next, owner, and base vectors in accordance with the invention.

Referring to FIG. 2, the vectors next and owner are shown. The next vector includes the next states, $s_1$, $s_2$, $s_3$, and so on. The owner vector shows which row in matrix L each entry in vector next belongs to. Thus, entries 202–206 belong to row A, while entries 212–216 belong to row B. The base vector indicates where in the next vector the first non-default element for a given row is located. Hence, for row B, the first non-default element is located at $next_{(base[B])}$, namely, entry 212. The next non-default element in row B can be located by traversing down the owner vector beginning at $owner_{(base[B])}$ until the next entry in owner is encountered that contains the row number B, in this case, entry 214. Observe that the very next entry in vector next, entry 206, does not belong to row B, as indicated in the owner vector. This means that the next entry in row B of transition matrix L is the default state, the value for which is obtained from vector default at $default_{(base[B])}$.

The length M of the compressed vector next and vector owner, is determined by the base addresses chosen for each row. The more densely the rows overlap, the higher a compression ratio is achieved:

$$M = 256 + \text{MAX}(base_0 \ldots base_{N-1}).$$

Table 2 below is a summary of the symbols used in the description of the compression algorithm.

TABLE 2

| Symbol | Description | Size |
| --- | --- | --- |
| N | number of states in the DFA | |
| M | size of the collapsed one-dimensional vector next and owner | |
| $L_{(0\ldots N-1, 0\ldots 255)}$ | original DFA transition matrix | N × 256 |
| $label_{(0\ldots N-1)}$ | indicates if a state is terminating state, if so which the associated class identifier | N |
| $default_{(0\ldots N-1)}$ | the default next state for each row | N |
| $base_{(0\ldots N-1)}$ | the base address for each row | N |
| $next_{(0\ldots M-1)}$ | the non-default next state | M |
| $owner_{(0\ldots M-1)}$ | the owner of each position in next, represents which row the corresponding next element belongs to | M |

An alternative, more formal description of the compression algorithm is given below, using a C-like notational format:

1. Find the default values:

```
for i = 0 to N-1
    default[i] = the value with maximum number of occurrences
        among {L(i,0), L(i,1) ... L(i,255)}
```

2. Zero out the default elements for each row:

```
for i = 1 to N
    for (j=0 to 255)
        if (L(i,j)==default[i]) L(i,j)=0;
```

3. Clear the vectors:

```
for (i=0 to MAX_VECTOR_SIZE)
    next(i)=0; owner(i)=-1;
```

4. Align the rows to the target vector:

```
next_base = 0;
for (i=1 to N)
    {
    not_fit = 1;
    while (not_fit)
        {
        not_fit = 0;      // assuming fit trial succeed
        for (j=0 to 255)  // tried to fit row[i] to next at next_base
            {
            if((L(i,j)!=0) && (Owner(next_base+j)!=-1)) // collision
                {
                not_fit = 1;       // trial failed
                next_base++;       // increment to try the next position
                break;
                }
            }
        }
    base(i) = next_base;
    for (j=0 to 255)  // copy the non-zero elements of L to next
        {              // and save the row info in owner
        if ( L(i,j) !=0 )
            {
            next(next_base+j) = L(i,j);
            next(next_base+j) = i;
            }
        }
    }
```

In general, the compression algorithm takes transition matrix $L_{(0\ldots N-1, 0\ldots 255)}$ as input, and generates the following data structures: $default_{(0\ldots N-1)}$, $base_{(0\ldots N-1)}$, $next_{(0\ldots M)}$ and $owner_{(0\ldots M)}$. The compression ratio $\lambda$ is calculated by the following equation:

$$\lambda = \frac{\text{size}(default_{(0\ldots N-1)} + base_{(0\ldots N-1)} + next_{(0\ldots M-1)} + owner_{(0\ldots M-1)})}{\text{size}(L_{(0\ldots N-1, 0\ldots 255)})} = \frac{N+N+M+M}{N+M}$$

Decompression is performed to do a DFA transition matrix lookup from the compressed data structures. To calculate the value of $L_{(x,y)}$ from vectors $default_{(0\ldots N-1)}$, $base_{(0\ldots N-1)}$, $next_{(0\ldots M)}$ and $owner_{(0\ldots M)}$ for a given current state X and input character Y, the following algorithm is used:

Input (x, y), Output $L_{(x,y)}$
1. $pos = base_{(x)}$
2. if $(owner_{(pos+y)} == X)$
   return $(next_{(pos+y)})$
   else
   return $(default_{(x)})$ The decompression algorithm looks up the base address for state X in the first step. Then it checks the vector entry owner$_{(pos+y)}$ to determine if next state L$_{(x,y)}$ is in the next vector. If so, the value in the vector entry next$_{(pos+y)}$ is returned; otherwise the default value for X default$_{(x)}$ is returned.

For each transition matrix decompression look up, the following operations are performed:
- one memory read operation to base$_{(x)}$
- one memory read operation to owner$_{(pos+y)}$
- one memory read operation to next$_{(pos+y)}$
- one memory read operation to default$_{(x)}$
- a comparison and selection operation Since the decompression requires five operations to do, it is very simple for hardware implementation, and satisfies the requirements for line rate processing.

C. Hardware Architecture of a Grammatical Packet Parser

A hardware parser according to one embodiment of the invention implements a labeled DFA that is driven by compressed data structures. The following hardware architecture assumes that several channels of time division multiplexed input packet data streams are presented to the parser over a byte link input interface. The parser lexically scans the input stream and parses through the resulting stream of lexical tokens to identify the protocol structure contained in a packet.

Figure 3:
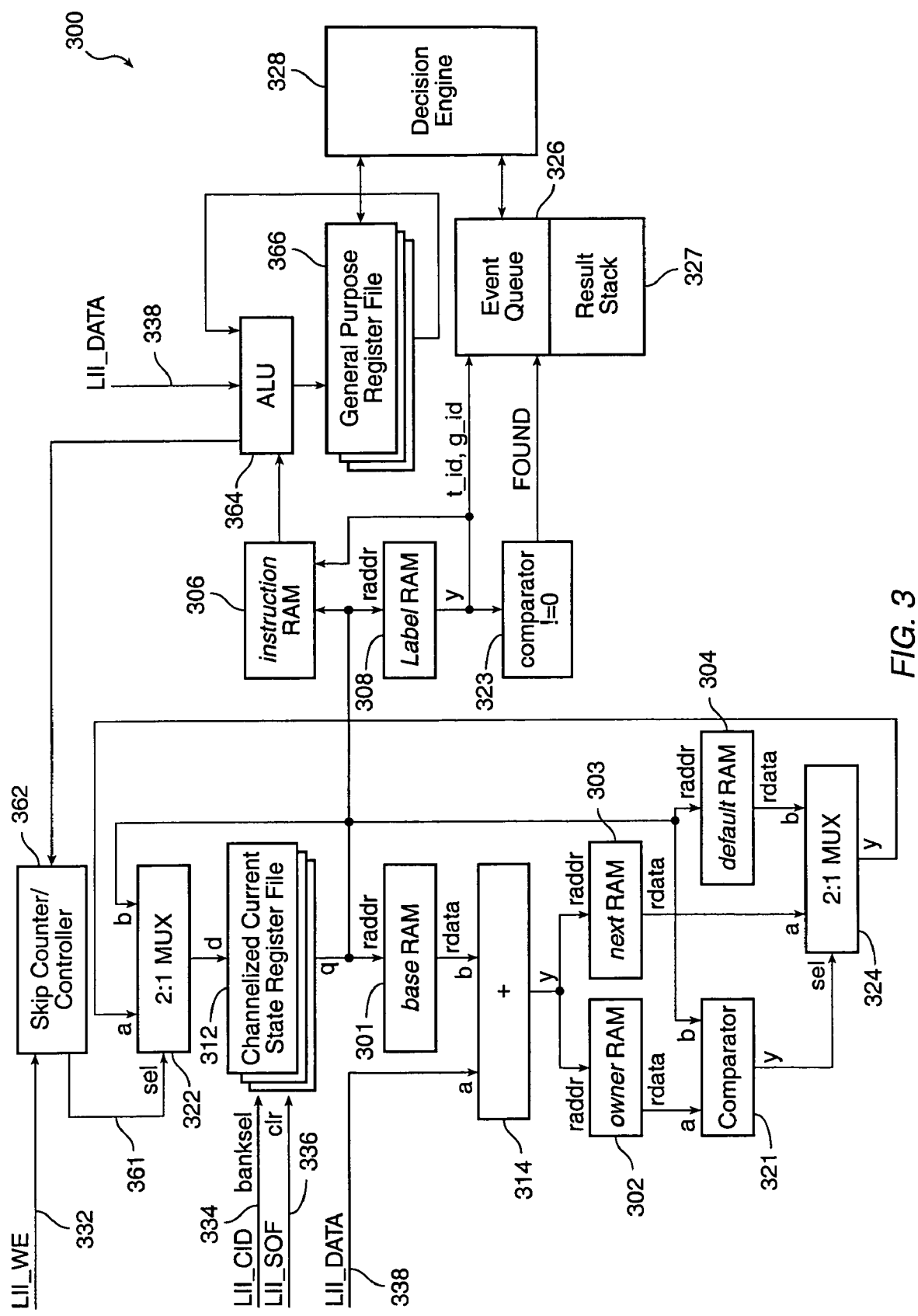
FIG. 3 is a high level block diagram of a hardware parser in accordance with the present invention.

The general architecture of an embodiment of the hardware classifier 300 is depicted by the high level block diagram of FIG. 3. This hardware structure implements the foregoing transition matrix decompression algorithm and a multi-channel DFA token recognizer. This embodiment of the invention provides a non-pipelined structure comprising five asynchronous RAMs 301–304 and 308, a register file 312, an adder 314, and comparators 321, 323. Table 3 describes the signals used in the diagram.

TABLE 3

| Signal | I/O | Description |
| --- | --- | --- |
| LII_SOF | Input | Indicates the start of an input frame |
| LII_CID | Input | Provide the channel index for the input data in the current cycle |
| LII_DATA | Input | Input packet data byte |
| LII_WE | Input | Data enable, asserted while the valid data is presented on LII |
| FOUND | Output | Asserted when a classification match is found |
| TOKEN_ID | Output | Provides the match token identifier |
| GROUP_ID | Output | Provides the match token group identifier |

The base RAM 301, owner RAM 302, next RAM 303, default RAM 304, and label RAM 308 are five asynchronous RAMs that are used to store the foregoing compressed labeled DFA data structure. These RAMs are loaded with the compiled code images at system start up. The current state register file 312 provides channelized context for the DFA based on signal LII_CID 334, which indicates on which channel the input packet is arriving. There is state information corresponding to each channel.

The general processing flow of the parser is as follows: The parser starts with the beginning state of the first pattern group. It uses the DFA to scan the input characters, i.e. lexical scanning. When the parser reaches an end (terminating) state of the DFA, it signifies that a matching pattern has been detected. The pattern informs the parser to take some action, depending on token_instr (see BNF). This action is application dependent. The maker of the switching device can define an appropriate instruction set according to the actual requirement of the switching device. Hence, the instruction set is application dependent. Continuing, the parser branches to the next pattern group. The parser then starts scanning again from the beginning state of the next parsing group until it reaches another end state. This process continues till the end of the packet or end of grammar graph (a pattern with no next_group_label) is reached.

A terminating state contains information, including the matched token identifier. As noted above, there are two types of terminating states: "grammar branch node" and "grammar end node." The label entry also contains flags that identifies whether a node is a non-terminating state, a terminating state branch node, or a terminating state end node. When the parser reaches an end node, the end of a grammar graph is reached. Hence no further parsing is required. The parser stops and reports the class identifier associated with this node. When the parser reaches a branch node, it reports the token identifier that is associated with the state (indicating it recognizes a token in the parsing process), but the parsing continues. The branch transition redirects the parser to the start state of the next token group. Since the branch transition is defined by the normal next, default and owner vectors, the parser makes the transition in the same way it processes a non-terminating state.

This action is very similar to the operation a typical compiler, the parser calls the lexical scanner to recognize a token, takes branches according to the recognized token, and calls the lexical scanner to scan for the next token.

Figure 4:
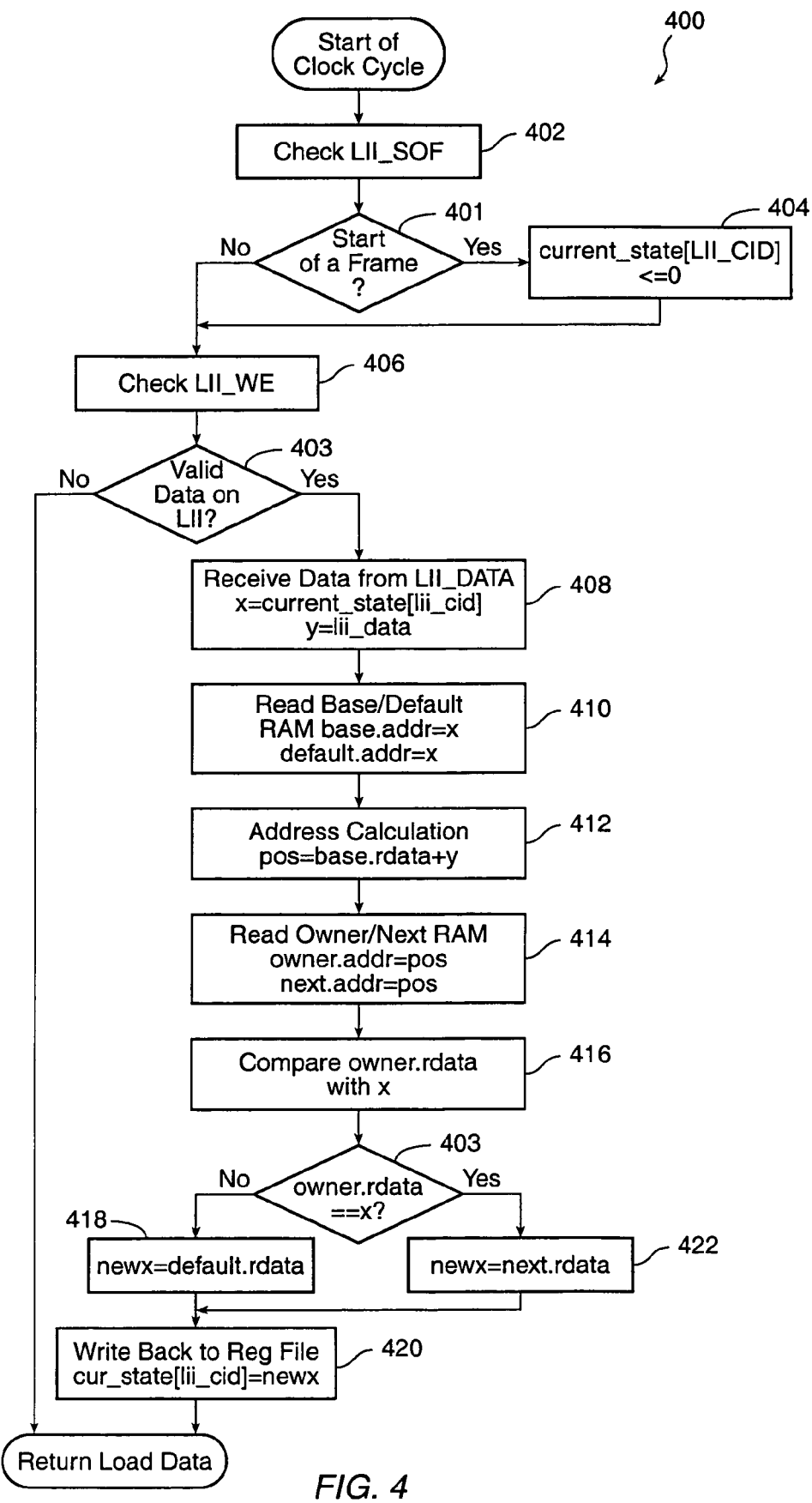
FIG. 4 is a flow chart highlighting the steps of operation of the hardware lexical classifier.

The discussion will now turn to the operation of hardware parser 300 in connection with the flow chart of FIG. 4. The flow chart outlines the highlights of the processing which takes place in the parser. Generally, the parser scans the input comprising a stream of data bytes which constitute an incoming data packet. As a result lexical tokens are identified and various states in the labeled DFA are reached. Along the way, token identifiers and group identifiers are produced, thus elucidating the structure of a received data packet; see for example FIG. 8. The packet is then handled according to the detected token identifiers and group identifiers during subsequent processing by the routing device; e.g. firewall filtering, policy-based routing, and so on.

At the beginning of each clock cycle, start of frame signal 336 is checked in step 402. If a determination is made in step 401 that a new frame is available, then channel index 334 is read to select the corresponding entry in register file 312. The output of the register file represents the current state x. This feeds into base RAM 301 and serves as an index into the base RAM. Processing continues with step 406 where data enable signal 332 is read. If a determination is made that data is not available on the link input interface (LII), then the parser simply continues to read data from the LII until the next cycle occurs.

If data is available, then processing proceeds to step 408, where data from LII is received. In step 410, the current state x feeds into the base RAM to produce an offset value at its rdata output. This offset value represents the current state (i.e., row) in the transition matrix. More particularly, the offset value represents the first column in the transition matrix. The offset value becomes an index into owner RAM 302 and next RAM 303. Step 410 corresponds to the operation pos←base$_{(x)}$. The current state x is also used to index into default RAM 304 which produces the default value (at its rdata output) associated with the current state.

Next, in step 412, the data from LII is delivered to the a input of adder 314. Here, the LII data is combined with the offset value that is produced from base RAM 301 to produce an offset position (pos) into owner RAM 302 and next RAM 303. This operation produces pos+y at the output of the adder. This offset position represents $L_{(x,y)}$ in the transition matrix, namely, the next state to which the transition occurs. Hence, in step 414, the offset value from the base RAM feeds into the owner RAM and the next RAM. The owner RAM produces a row identifier owner$_{(pos+y)}$ and the next RAM produces a next state value. The row identifier produced by the owner RAM indicates in which row (in the transition matrix) next$_{(pos+y)}$ belongs.

Steps 416 and 403 determine whether the next state value belongs to the same state (i.e., row) as the current state x. Hence, the output of owner RAM 302 is compared by comparator 321 against the current state x obtained from the state register file 312. If the next state value does not belong to the same state as the current state x, then the new state is set (step 418) to the default state value default$_{(x)}$, obtained from default RAM 304. Selector 324 is controlled to produce its b input which is then delivered to selector 322. If the next state value does belong to the same state as the current state x, then the new state is set (step 422) to the state obtained from next RAM 304. Selector 324 is controlled to produce its a input which is then delivered to selector 322. At step 420, since signal 332 is asserted, selector 322 will produce is a input which then feeds into the register file, thereby effectuating an update of the current state.

In the case where signal 332 (LII_WE) is de-asserted, meaning that no valid input data is available in the current clock cycle, the scanner 300 should remain in the current state. The selector 322 provides this by selecting its b input, which receives the current state. This action simply feeds it back to the register file thus preserving the current state.

Referring back to FIG. 3, for each cycle, the current state is also delivered to label RAM 308. The label RAM outputs TOKEN_ID (t_id) or GROUP_ID (g_id) to an event queue 326 for further processing downstream by decision engine 328. The label RAM also outputs an indication whether the current state is a terminating state. If it is, then comparator 322 will issue a signal indicating the FOUND condition to the event queue. Otherwise, the FOUND condition is not asserted and the event queue ignores the output of the label RAM. The event queue is a FIFO (first-in first-out queue) that holds the parser results, or other events (operations) generated by the scanner.

An instruction RAM 306 is provided for parsing. The instruction RAM serves two purposes in the parser. The first purpose is to support context dependent REs as will be discussed below. The second purpose is for parsing.

Parsing instructions exist only for the terminating states of an RE (last state of a pattern). The last state of a pattern indicates a pattern has been recognized. The parsing instruction specifies the next_group_label (see the BNF above) and token_instr. The next_group_label tells which DFA state (the beginning state of the next token_group) the parser should use to continue the scanning process, and the token_instr is customizable according to the actual application.

Further in accordance with the invention, the token information not only goes to the event queue but also to a result stack 327. This allows for generating discrete events which can then be provided to the decision engine 328, for example, while the parser finishes processing a packet. In response to such events, the decision engine can fetch detailed information such as lower layer protocol types, header offsets for the packet from the result stack.

It is understood that the instruction set that is implemented is dependent upon the specific application of the network switching device and will vary for any given implementation of switch or router device. Thus, a device provider can implement an appropriate instruction set for a given switching device to accommodate the packet processing scenarios contemplated for the device.

D. Context Dependent Processing

One problem with prior art DFA-based scanning techniques is that prior art DFAs are incapable of performing context dependent recognition. A regular expression cannot define language structure such as:

$$n(x_1 x_2 \ldots x_M),$$

where an arbitrary input character n is followed by M occurrences of x and M is dependent on the input character n. Because the number of characters following n is dependent on the value of input character n, the structure is inherently context-dependent. Therefore, such sequences cannot be represented by a context free lexical rule.

Given the valid range for the value of n to be [1,N], the expression can be expanded into the static lexical expression:

$$1(x_1)|2(x_1 x_2)|3(x_1 x_2 x_2)| \ldots N(x_1 x_2 \ldots x_M)$$

While this representation can be converted into a DFA that recognizes the lexicon, the complexity of the expression, and the size of DFA quickly expands beyond the practical range as N increases.

An expression of the form above is not unusual in packet headers. For example, the IP header is a variable-length data structure, where the IHL field in the first byte of IP header is the size of IP header. Similarly, TCP headers are also variable-length.

To support recognition of these context dependent structures, the present invention in one embodiment includes enhancements to the GPCL language definition, the GPCL compiler, and the hardware structure. These enhancements include skip, register save, and register reference operators as outlined in Table 4.

TABLE 4

| Expression | Matches | Example |
|---|---|---|
| ^ | Skip X number of bytes, where X is the current input byte value | ^ |
| {^mask <shift-k} | Skip ((X &mask)<<shift − k), X AND'd with mask, then left-rotated by shift amount, then subtract k | {^0f<3−4} |
| {~regid=mask <shift-k} | Save the value ((X &mask)<< shift − k) into register regid | {~1=0f<3−4} |
| {~regid^} | Skip (~regid) | {~1^} |
| {~regid = ~regida operator ~regidb} | register arithmetic | {~1=~2+~3} |

These enhanced regular expression operators add context dependent processing and register file manipulation functions to the GPCL language. The GPCL compiler is accordingly enhanced to compile these operators into DFA instructions. Therefore, the enhanced GPCL compiler produces an additional vector: instruction$_{(0 \ldots N-1)}$ that contains the binary code for the instruction associated with each DFA state. The invention is not limited to the foregoing described instructions. Rather, this aspect of the invention lies in the association of instructions with DFA states. It should be clear that other instructions can be included, in accordance with the spirit of the invention, for any given implementation of switch or router device. Thus, a device provider can implement an appropriate instruction set for a given switching device to accommodate all possible packet processing scenarios contemplated for the device. The end-user can then define a set of policies using the enhanced regular expressions of the GPCL to customize the device for her particular needs.

The parser shown in FIG. 3, accordingly, includes hardware to accommodate the enhanced regular expressions. Generally, each state of the enhanced DFA is associated with one or more instructions that do arithmetic on the input data, register manipulation, or skipping. For some data packets, the regular expressions used to identify them do not require the enhanced regular expressions. In those cases, the DFA states are associated with the NULL instruction. In cases where one or more enhanced regular expressions are needed to match a data packet, the DFA states will contain one or more non-NULL instructions. Thus, upon reaching a state that has one or more non-NULL instructions associated with it, the instructions are executed before making a state transition to the next DFA state.

The following examples are provided to illustrate applications of the foregoing regular expressions to typical network data packets:

1. match an IP over VLAN Ethernet Frame—
   ➔.{12}8100.{2}0800⬅
   .{12} skip the first 12 bytes, which are DA and SA, don't care
   8100 match the type field value of 0x8100, indicates VLAN
   .{2} skip next two bytes, which comprises VLANTAG, don't care
   0800 next word is TYPE, 0x0800 indicates IP protocol
2. match any packet containing "yahoo" within the first 40 bytes of the header—
   ➔.{0–35}8100"yahoo"⬅
   .{0–35} skip 0 to 35 occurrences of any character, until . . .
   8100 0x8100 is reached, and
   "yahoo" followed by the string "yahoo"
3. match any TCP/UDP packet with (source_port==5) over an IP over Ethernet protocol—
   ➔.{12}0800{^0f<0-0}0005⬅
   .{12} skip the first 12 bytes, which are DA and SA, don't care
   8000 match the type field value of 0x8000, indicates IP packet
   {^0f<0–0} header_length is the lower 4 bits of ip header, this expression simply masks the next byte scanned in by 0xf to produce a value, which represents how many additional bytes will be skipped
   0005 TCP/UDP source port number=0x0005
4. match telnet over TCP over IP over VLAN Ethernet
   ➔.{12}8100 . . . 0800{~1=^0f<0–0a}.{8}06.{~1^} . . . 17⬅
   .{12} skip the first 12 bytes, which are DA and SA, don't care
   8100 . . . 0x8100 identifies VLAN
   . . . next two bytes VLANTAG
   0800 next word is TYPE, 0x0800 indicates IP protocol
   {~1=^0f<0–0a} header_length is the lower 4 bit of ip header
   save (header_length—0x0a) in register 1
   .{8} skip 8 bytes to get to IP protocol field
   06 protocol==0x06, this identifies TCP
   {~1^} skip according to register 1 value to get to TCP header
   . . . skip two-byte TCP source port number
   17 TCP destination port=0x17, identifies as TELNET protocol FIG. 3 shows the additional hardware to handle the enhanced regular expressions, including a skipping logic 362, the instruction RAM 306, an ALU (arithmetic logic unit) 364 that executes the instruction, and a general purpose register file 366.

In this embodiment of the invention, enable signal 332 feeds into skipping logic 362. The skipping logic produces a select signal 361 which feeds into selector 322. ALU 364 receives in one of its data inputs the incoming data on the link input interface lines 338.

Parser 300 scans the input data and follows the DFA in the original way, as discussed in connection with the processing outlined in FIG. 4. In addition, the current state value x is used as an address to fetch an instruction from the instruction RAM 306. The instruction is decoded by ALU 364 to do either arithmetic on the input data 338 to manipulate data in register file 366, or to send control information to the skipping logic 362. In the case of a skip, the skipping logic skips as many subsequent input bytes as called for by the value of the current input byte. The b input to mux 322 receives the current state value. A counter in the skipping logic counts down during a skip operation. While the counter>0, the b input is selected so that the next state is the current state. Thus, no state transitions occur when the scanning hardware is executing a skip instruction.

The ALU calculation result is either saved in register file 366, or sent to the skipping logic. The register file and the event queue are accessible by a downstream decision engine 328. This architecture allows the DFA to skip data bytes according to certain data fields in the input packet. It can also extract important data fields in the packet and provide the extracted data to the decision engine by storing the extracted data in the register file. The decision engine is essentially the rest of the switch or routing device which receives the classified packets and processes them accordingly.

F. Alternate Embodiments

According to the application requirements and the design constrains, alternative structures can be used in the implementation.

(i) Fixed Rule Protocol Parser

Figure 5:
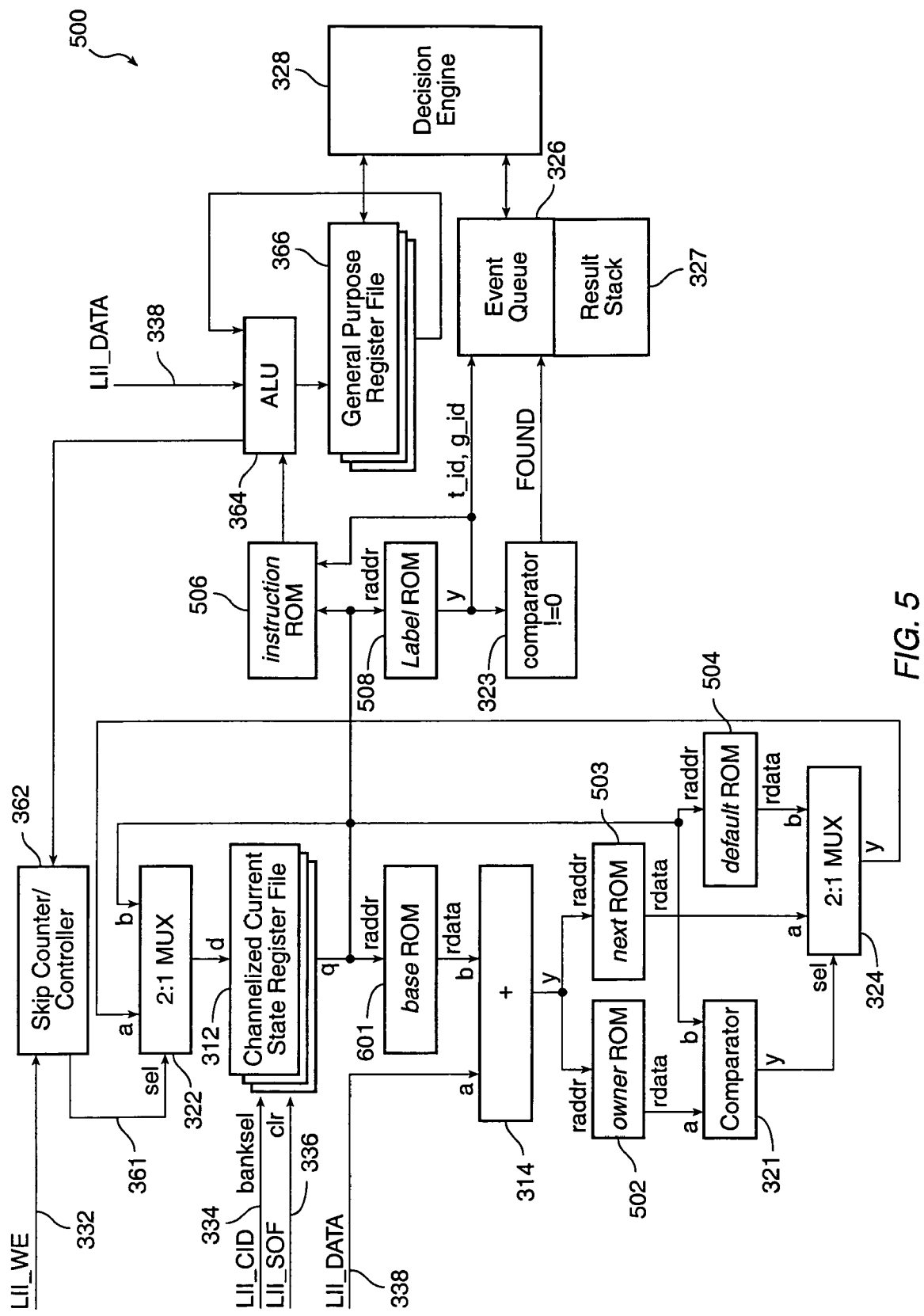
FIG. 5 is a high level block diagram of an alternate embodiment of the hardware lexical classifier.

FIG. 5 shows a ROM version of the parser of FIG. 3. Some applications require the packet parser to identify a fixed set of policies. The same GPCL and compiler techniques can be used to generate a compressed form of the DFA transition matrix from the policy set. The generated base, owner, next, default, instruction, and label vectors do not need to be changed, thus can be stored in lower cost ROMs. Hence, the RAMs 301–308 are replaced with ROMs 501–508.

(ii) Pipelined Implementation for High Clock Rate Application

The hardware structure in FIGS. 3 and 5 can be pipelined to achieve higher clock rate and to use synchronous RAMs in the design. The pipeline structure can be optimized in various ways according to the system clock requirements, timing constrains, link input interface definitions.

(iii) Front-End Traffic Manager

Figure 9:
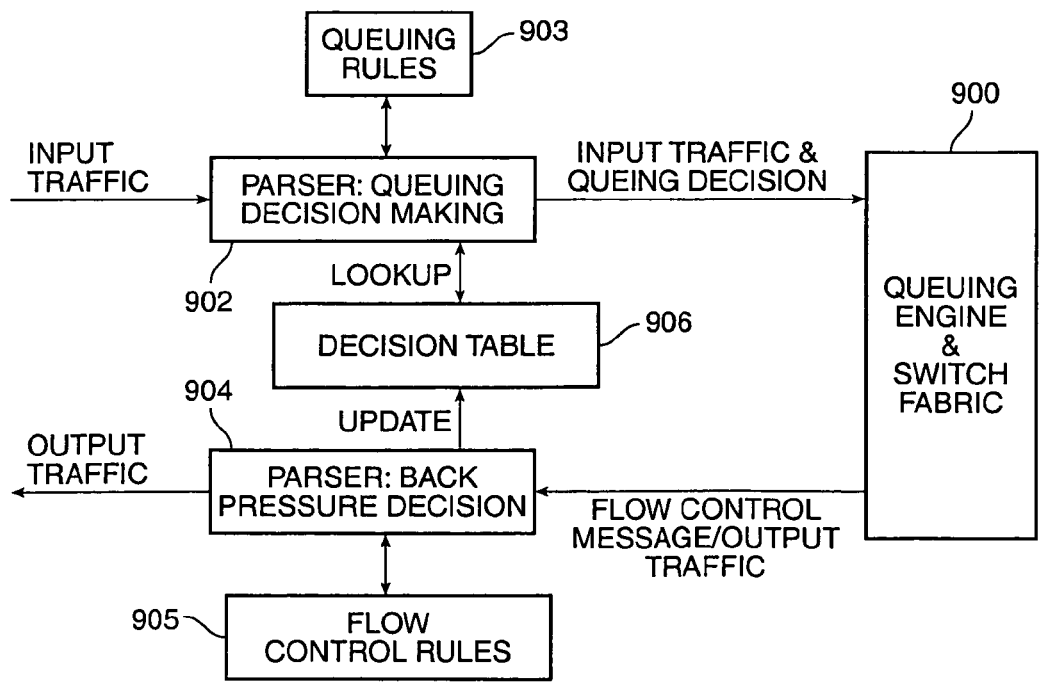
FIG. 9 illustrates an embodiment of the invention that is a traffic manager.
Figure 10A:
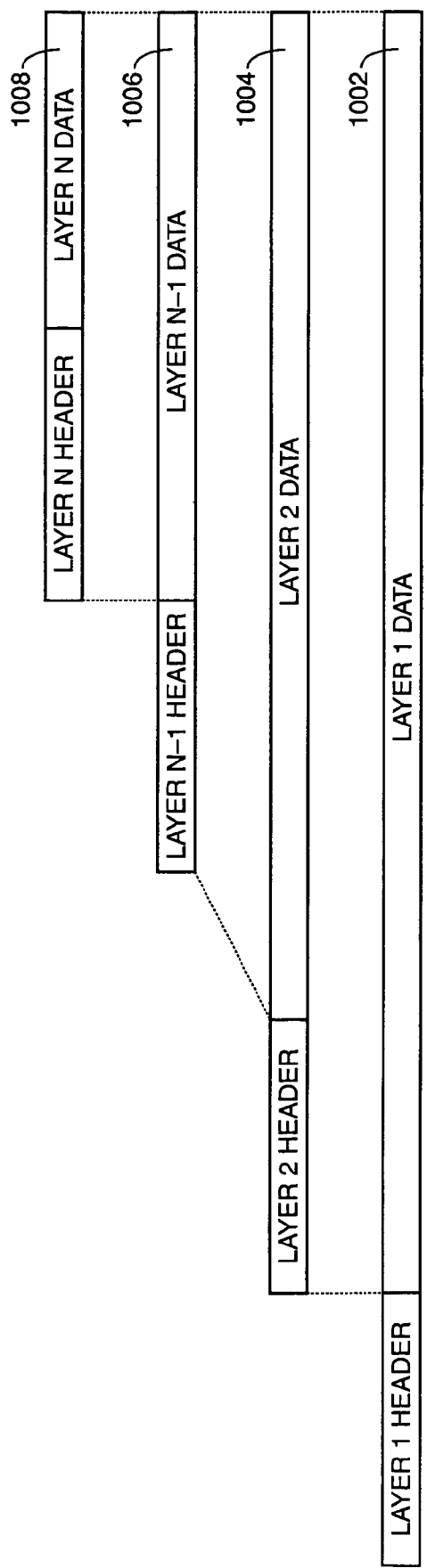
FIGS. 10A and 10B illustrate the hierarchical nature of protocols.
Figure 10B:

FIG. 9 shows another embodiment in which the parser hardware of the invention is used in the traffic manager component of an ATM switch. Two parsers are configured in a back-to-back arrangement to handle bi-directional traffic. A first parser 902 processes input traffic to provide information for queuing decision making based on first queuing rules 903. A policy index, namely the token id or token group id, matched by the parser is used to look up a decision table 906 that defines how packets should be mapped into queues. The queuing decisions are passed along with the packets to a downstream queuing engine and switch fabric 900. A second parser 904 analyzes the out-going traffic. The normal data traffic is passed to the output port. The flow control messages are identified by parser 904 based on a second set of rules 905 and translated to decision table updates. In this architecture, the input parser 902 makes the queuing decisions, the queuing engine 900 generates flow control messages according to the status of the queues, and the output parser 904 identifies the flow control messages and updates the decision table 906. This arrangement provides a tight feed-back loop that can run at wire speed. The flow control information is passed to the input decision engine mixing with outgoing traffic. The queuing rules are defined as the program to the input parser, and the flow control rules are defined as the program to the output parser. This double parser architecture provides a flexible mechanism to construct an adaptive queuing decision engine with flow control capability in which both queuing rules and flow control rules are user programmable.

(iv) Performance Considerations

Various performance/cost tradeoffs can be made depending on any given operating situation. For example, the data width accepted by the parser can change according to the clock rate/circuit size trade off. The previous discussion assumes an 8-bit data width for purposes of clarity of explanation. By using a small data width, the gate count of the control circuit and the size of the RAMs can be reduced significantly, but the circuit has to run at a faster clock rate to support the same throughput. By increasing the data width, the hardware requires larger RAMs, but clock rate can be reduced.

In a further embodiment of the invention, two banks of RAMs can be used in the system to allow the policies to be changed on the fly. At any given time, one bank of RAMs is being used by the parser. Meanwhile, the other bank can be updated by a control entity to implement a new policy. When the data structures are loaded, the parser can switch to the other bank of RAMs to use the new rules for parsing without interruption of service.

Accordingly, the present invention, in various specific embodiments:

Provides a versatile enhanced regular expression based GPCL (Packet Classifier Language) for user policy definition. Support arbitrary protocol hierarchy definition that is describable using a regular expressions along with syntax rules.

Concurrently matches a large number of complex rules. The maximum number of rules and complexity is only limited by the size the transition RAM size chosen in an implementation.

Includes a compiler that maps the rule set into binary code for hardware. The compiler compresses the binary code to reduce the code image size.

Provides for programmable packet parser hardware that runs at the same clock frequency as the data word arrival rate from the network and yet sustains line rate parsing of packets. The compressed code image generated by the compiler is loaded into the RAM in the packet parser. The hardware decompresses the code and scans the input data dynamically. The hardware can support input packet streams from several concurrent input channels.

Includes enhanced DFAs with ALU and a register file to support data context dependent skipping and field extraction operation in the parser hardware. The skipping function is the key to supporting context dependent rules. The enhancement can significantly reduce the numbers of DFA states required to recognize variable length protocol headers.

What is claimed is:

1. A method for identifying protocol encapsulation in received network data at a networking device comprising:
   providing a language definition including a grammar;
   receiving incoming network data; and
   processing said incoming network data in accordance with a formal language processing technique using said language definition, including:
      providing a deterministic finite automaton (DFA) based on a set of regular expressions;
      performing lexical token scanning of said network data to produce plural lexical tokens including recognizing lexical tokens contained in said data packets using said DFA, said DFA including a representation of said lexical tokens;
      parsing said network data using said grammar, said network data being organized into data packets, including parsing said lexical tokens to identify grammatical structure among said lexical tokens using said DFA to identity protocol encapsulation in said network data.

2. The method of claim 1 wherein said grammar is a grammar graph represented by said DFA.

3. In a data packet network switching device, a method for processing data packets comprising:
   providing a language definition including a grammar;
   receiving plural data packets, each having a length not necessarily equal to one another; and
   for each data packet, processing said data packet according to a formal language processing technique using said language definition including
      providing a deterministic finite automaton (DFA) based on a set of regular expressions,
      lexically scanning said data packet to produce plural lexical tokens including using said DFA to recognize said lexical tokens, said DFA including a representation of said lexical tokens,
      parsing said lexical tokens using said grammar to identify one or more protocol encapsulation including identifying grammatical structure among said lexical tokens using said DFA, and
      processing said data packet based on said identified protocols.

4. The method of claim 3 further including compiling said grammar to produce a grammar graph.

5. The method of claim 3 further including compiling said regular expressions to produce said DFA.

6. The method of claim 5 further including incorporating said grammar graph into said DFA.

7. In a data packet receiving and forwarding device, a method for processing data packets constituting a data stream, said method comprising:
   receiving a description of grammar rules in the form of a grammar packet classification language;
   compiling said grammar packet classification language to produce a grammar graph;

providing a deterministic finite automaton (DFA) based on a set of regular expressions;
configuring a programmable grammatical packet classifier with said grammar graph;
processing said data stream in accordance with a formal language processing technique using said grammar packet classification language including:
  performing lexical token scanning of said data stream to produce plural lexical tokens including recognizing lexical tokens contained in said data packets using said DFA, said DFA including a representation of said lexical tokens; and
  parsing said data stream to identify a protocol structure in a received data packet, including parsing said lexical tokens to identify grammatical structure among said lexical tokens using said DFA to identify protocol encapsulation in said stream of data; and
processing said received data packet in accordance with said protocol structure.

8. The method of claim 7 further including:
receiving a description of classification rules in a lexical classification language;
compiling said classification language to produce said DFA; and
configuring said grammatical packet classifier with said DFA.

9. The method of claim 8 wherein said grammar graph is incorporated into said DFA.

10. The method of claim 8 wherein said regular expressions include arithmetic and logic operations.

11. The method of claim 10 wherein said regular expressions further include skip operations.

12. The method of claim 11 wherein said regular expressions further include data storage operations.

13. A network data packet classifier comprising:
an input port for receiving network data packets comprising a stream of data;
a memory assemblage configured with data representing a deterministic finite automaton (DFA), said DFA defined by a language definition and representing a grammar graph and plural regular expressions; and
decompression logic operatively coupled to said memory assemblage and configured to process said stream of data according to a formal language processing technique using said language definition including a step of lexical token scanning to scan said stream of data with said DFA to find a matching one of said regular expressions thereby producing plural lexical tokens, said DFA including a representation of said lexical tokens,
said decompression logic further configured to parse said lexical tokens with said DFA to identify grammatical structure among said lexical tokens using said DFA to identify a protocol encapsulation in a received network data packet,
wherein processing of said network data packets depends on said protocol encapsulation.

14. The classifier of claim 13 wherein some of said regular expressions include arithmetic instructions and logic instructions, said memory assemblage further configured to contain said instructions, the classifier further including an arithmetic logic unit operatively coupled to said decompression logic and configured to execute said instructions.

15. The classifier of claim 14 further including at least one register operatively coupled to said arithmetic logic unit, said arithmetic logic unit further configured to store data into said register in response to a save instruction.

16. The classifier of claim 14 further including skip logic operatively coupled to said logic component and configured to skip over an amount of data in response a skip instruction.

17. The classifier of claim 13 wherein said network data packets can vary from one packet to another.

18. The classifier of claim 13 wherein said DFA is in compressed form.

19. The classifier of claim 18 wherein said DFA comprises plural non-default states and plural default states, and said memory assemblage comprises a base memory, a next-state memory, and a default-state memory; said base memory configured to contain address locations of said next-state memory, said next-state memory representing all of said non-default states, said default-state memory representing all of said default states.

20. The classifier of claim 19 wherein said memories are random access memories.

21. The classifier of claim 19 wherein said memories are read-only memories.

22. A network packet classifier comprising:
means for receiving an incoming network packets; and
means for identifying protocol structure in said network packets including means for processing said network packets in accordance with a formal language processing technique using a language definition, including means for scanning said network packets to match patterns in said network packets constituent data against plural regular expressions to produce lexical tokens and means for parsing through said lexical tokens using a grammar, said regular expressions and said grammar being defined by said language definition,
said means for scanning including a memory component configured with data to represent a deterministic finite automaton (DFA) based on said regular expressions, said DFA including a representation of said lexical tokens,
said means for scanning configured to recognize said lexical tokens contained in said network packet using said DFA,
said means for parsing configured to identify grammatical structure among said lexical tokens using said DFA to identify protocol encapsulation in said incoming network packet.

23. The classifier of claim 22 wherein said memory component is further configured to include said grammar.

24. The classifier of claim 22 wherein said regular expressions include arithmetic specifiers and said means for classifying includes an arithmetic logic unit configured to perform operations in accordance with said arithmetic specifiers.

* * * * *